United States Patent [19]

Gabbay

[11] Patent Number: 6,124,221
[45] Date of Patent: Sep. 26, 2000

[54] ARTICLE OF CLOTHING HAVING ANTIBACTERIAL, ANTIFUNGAL, AND ANTIYEAST PROPERTIES

[76] Inventor: Jeffrey Gabbay, 14/21 Jabotinsky St, Jerusalem, Israel

[21] Appl. No.: 09/327,400

[22] Filed: Jun. 7, 1999

Related U.S. Application Data

[63] Continuation-in-part of application No. 09/201,939, Dec. 1, 1998, Pat. No. 5,939,340, which is a continuation-in-part of application No. 08/693,656, Aug. 9, 1996, Pat. No. 5,871,816, and a continuation-in-part of application No. 08/693,657, Aug. 9, 1996, Pat. No. 5,981,066.

[51] Int. Cl.[7] .......................... D03D 15/00; A41B 11/00
[52] U.S. Cl. .................... 442/229; 442/231; 442/228; 442/376; 442/377; 442/379; 2/69
[58] Field of Search .................................. 442/6, 10, 11, 442/13, 228, 229, 231, 238, 243, 261, 263, 264, 268, 376, 377, 379, 381, 395, 387; 2/69

[56] References Cited

U.S. PATENT DOCUMENTS

| | | | |
|---|---|---|---|
| 5,871,816 | 2/1999 | Tal | 427/304 |
| 5,939,340 | 8/1999 | Gabbay | 442/229 |
| 5,981,066 | 11/1999 | Gabbay | 428/389 |

*Primary Examiner*—William Krynski
*Assistant Examiner*—J. M. Gray
*Attorney, Agent, or Firm*—Townsend and Townsend and Crew LLP

[57] ABSTRACT

The invention provides an article of clothing having antibacterial, antifungal, and antiyeast properties, comprising at least a panel of a metallized textile, the textile including fibers selected from the group consisting of natural fibers, synthetic cellulosic fibers, regenerated protein fibers, acrylic fibers, polyolefin fibers, polyurethane fibers, vinyl fibers, and blends thereof, and having a plating including an antibacterial, antifungal and antiyeast effective amount of at least one oxidant cationic species of copper.

6 Claims, No Drawings

ARTICLE OF CLOTHING HAVING ANTIBACTERIAL, ANTIFUNGAL, AND ANTIYEAST PROPERTIES

The present specification is a continuation-in-part of U.S. Ser. No. 09/201,939, filed Dec. 1, 1998, now U.S. Pat. No. 5,939,840, which in turn is a continuation-in-part of U.S. Ser. No. 08/693,656 filed Aug. 9, 1996, now issued as U.S. Pat. No. 5,871,816, and a continuation-in-part of U.S. Ser. No. 08/693,657 filed Aug. 9, 1996, now 5,981,066, all of which are incorporated by reference in their entirety for all purposes.

The present invention relates to an article of clothing. More particularly, the present invention relates to an article of clothing, having antibacterial, antifungal and antiyeast properties.

In both WO 98/06508 and in WO 98/06509, which correspond, respectively, to the latter U.S. applications, and the teachings of which are incorporated herein by references, the state of the prior art is described as follows:

Beds commonly are infested by tiny mites. These mites eat bacteria and fungi that grow on epidermal scales shed by people who sleep in the beds. Fragments of dead mites and mite excreta, are allergens, to which asthmatics and people with dust allergens are sensitive. It has been found that some metals and metal oxides, notably Cu, CuO, Ag and $Ag_2O$, repel mites.

The conventional method for making textiles inhospitable to mites is to treat the textiles with an organic acaricide such as benzyl benzoate. For example, Bischoff et al., in U.S. Pat. No. 4,666,940, teach an acaricide that includes benzyl benzoate and a solid powder carrier whose particles are of a size suitable for ingestion by the mites. These acaricides must be replaced every time the textile is laundered. Thus, Bischoff et al. recommend using their acaricide on textiles, such as carpets and upholstery, that are not laundered frequently. An inherently acaricidal bedsheet would keep a bed free of mites, even after multiple launderings, without the need to reapply acaricide to the bedsheet.

The methods known in the prior art for bonding a metal or a metal oxide to a textile generally require that the metal or its oxide be bonded indirectly to the textile. For example, the metal may be reduced to a powder and suspended in a binder. The binder-metal mixture then is applied to the textile, with the binder, and not the metal, bonding to the textile. Alternatively, the metal is reduced to a powder, an adhesive is applied to the textile, and the metal powder is spread on the adhesive. Examples of both such methods may be found in U.S. Pat. No. 1,210,375, assigned to Decker. These methods are less than satisfactory for the above applications, for at least two reasons. First, the carrier or adhesive may entirely encapsulate the metal or metal oxide powder particles, inhibiting their contact with mites, fungi and bacteria, and making the textile useless as an acaricide, fungicide, or bactericide. Second, multiple launderings tends to weaken the binder or adhesive and loosen or remove the particles.

Two notable exceptions to the general rule that metals and metal oxides have not heretofore been bonded directly to textiles are nylon textiles and polyester textiles, which may be plated with metals using standard electrolyses plating processes for plating plastics. The specific electrolyses plating methods known to the art are restricted in their applicability to only certain plastics, however. In particular, they are not suited to natural fibers, nor to most synthetic fibers.

With this state of the art in mind, both of the publications taught various aspects of a textile with a full or partial metal or metal oxide plating directly and securely bonded to the fibers thereof.

More specifically, in WO 98/06509 there is provided a process comprising the steps of: (a) providing a metallized textile, the metallized textile comprising: (i) a textile including fibers selected from the group consisting of natural fibers, synthetic cellulosic fibers, regenerated fibers, acrylic fibers, polyolefin fibers, polyurethane fibers, vinyl fibers, and blends thereof, and (ii) a plating including materials selected from the group consisting of metals and metal oxides, the metallized textile characterized in that the plating is bonded directly to the fibers; and (b) incorporating the metallized textile in an article of manufacture.

In the context of the invention the term "textile" includes fibers, whether natural (for example, cotton, silk, wool, and linen) or synthetic yarns spun from those fibers, and woven, knit, and non-woven fabrics made of those yarns. The scope of the invention includes all natural fibers; and all synthetic fibers used in textile applications, including but not limited to synthetic cellulosic fibers (i.e., regenerated cellulose fibers such as rayon, and cellulose derivative fibers such as acetate fibers), regenerated protein fibers, acrylic fibers, polyolefin fibers, polyurethane fibers, and vinyl fibers, but excluding nylon and polyester fibers, and blends thereof.

The invention comprised application to the products of an adaptation of technology used in the electrolyses plating of plastics, particularly printed circuit boards made of plastic, with metals. See, for example, Encyclopedia of Polymer Science and Engineering (Jacqueline I. Kroschwitz, editor), Wiley and Sons, 1987, vol. IX, pp 580–598. As applied to textiles, this process included two steps. The first step was the activation of the textile by precipitating catalytic noble metal nucleation sites on the textile. This was done by first soaking the textile in a solution of a low-oxidation-state reductant cation, and then soaking the textile in a solution of noble metal cations, preferably a solution of Pd++ cations, most preferably an acidic $PdCl_2$ solution. The low-oxidation-state cation reduces the noble metal cations to the noble metals themselves, while being oxidized to a higher oxidation state. Preferably, the reductant cation is one that is soluble in both the initial low oxidation state and the final high oxidation state, for example Sn++, which is oxidized to Sn++++, or Ti+++, which is oxidized to Ti++++.

The second step was the reduction, in close proximity to the activated textile, of a metal cation whose reduction was catalyzed by a noble metal. The reducing agents used to reduce the cations typically were molecular species, for example, formaldehyde in the case of Cu++. Because the reducing agents were oxidized, the metal cations are termed "oxidant cations" herein. The metallized textiles thus produced were characterized in that their metal plating was bonded directly to the textile fibers.

In preferred embodiments, the article of manufacture referred to therein.

In WO 98/06508 there is described and claimed a composition of matter comprising:
(a) a textile including fibers selected from the group consisting of natural fibers, synthetic cellulosic fibers, regenerated protein fibers, acrylic fibers, polyolefin fibers, polyurethane fibers, vinyl fibers, and blends thereof; and
(b) a plating including materials selected from the group consisting of metals and metal oxides; the composition of matter characterized in that the plating is bonded directly to the fibers.

The publication also claims a composition of matter comprising:

(a) a textile including fibers selected from the group consisting of natural fibers, synthetic cellulosic fibers, regenerated protein fibers, acrylic fibers, polyolefin fibers, polyurethane fibers, vinyl fibers, and blends thereof; and (b) a plurality of nucleation sites, each of the nucleation sites including at least one noble metal; the composition of matter characterized by catalyzing the reduction of at least one metallic cationic species to a reduced metal, thereby plating the fibers with the reduced metal.

In addition, the publication teaches and claims processes for producing the products.

A preferred process for preparing a metallized textile according to the publication comprises the steps of:

a) selecting a textile, in a form selected from the group consisting of yarn and fabric, the textile including fibers selected from the group consisting of natural fibers, synthetic cellulosic fibers, regenerated protein fibers, acrylic fibers, polyolefin fibers, polyurethane fibers, vinyl fibers, and blends thereof;

b) soaking the textile in a solution containing at least one reductant cationic species having at least two positive oxidation states, the at least one cationic species being in a lower of the at least two positive oxidation states;

c) soaking the textile in a solution containing at least one noble metal cationic species, thereby producing an activated textile; and d) reducing at least one oxidant cationic species in a medium in contact with the activated textile, thereby producing a metallized textile.

While the metallized fabrics produced according to the publications are effective acaricides, it has now been found that they are also effective in preventing an/or treating bacterial, fungal and yeast infections which afflict various parts of the human body and that therefore the incorporation of at least a panel of a metallized textile material in an article of clothing can have extremely beneficial effect.

Thus, for example, a large number of people suffer from discomfort in the crotch area with symptoms such as itching and skin rash due often to the buildup of undesirable fungus and bacteria. The fungus that causes the condition known as "Thrush" or yeast infection is *Candida Albicans*". While yeast infections are often internal they can also be external and manifest themselves with superficial lesions, itching, etc. Tinea Pedis can also appear in the crotch area of both women and men.

Therefore, an underwear that has a treated textile insert located in the crotch will attack dermatital fungi and relieve the wearer of uncomfortable fungal symtoms is sought and has now been found to be provided by the present invention.

Similarly, the fungus which causes Athletes foot is Tinea Pedis. The bacteria that cause foot odor are *brevibacterium, acinetobacter* and *micrococcus*.

It has been found that an article of hosiery, including at least a panel of metallized textile according to the present invention, is effective for treating and preventing Athletes foot and foot odor.

With this state of the art in mind, and after further research and development there is now provided according to the present invention an article of clothing having antibacterial, antifungal, and antiyeast properties, comprising at least a panel of a metallized textile, the textile including fibers selected from the group consisting of natural fibers, synthetic cellulosic fibers, regenerated protein fibers, acrylic fibers, polyolefin fibers, polyurethane fibers, vinyl fibers, and blends thereof, and having a plating including an antibacterial, antifungal and antiyeast effective amount of at least one oxidant cationic species of copper.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE 1

Step A

A metallized fabric was prepared as described in Example 1 of WO98/06508.

A dilute acidic solution of $SnCl_2$ was prepared by dissolving $SnCl_2$ and concentrated HCl in water.

A dilute acidic solution of $PdCl_2$ was prepared by dissolving $PdCl_2$ 10 and concentrated HCl and water.

A cotton fabric 250×250 cm was activated as follows:

Soak in a bath of the $SnCl_2$ solution

Soak in a bath of the $PdCl_2$ solution.

A dilute basic $CuSO_4$ solution was prepared by dissolving $CuSO_4$ and NaOH (in approximately equal weight proportions), a chelating agent, and polyethylene glycol in water.

The activated cotton fabric and formaldehyde were added to the $CuSO_4$ solution under a pure oxygen atmosphere. After between 2 minutes and 10 minutes, the cotton fabric was removed.

The palladium deposited on the cotton fabric in the activation step catalyzed the reduction of the Cu++ by the formaldehyde, providing a layer of copper tightly and intimately bonded to the fibers of the cotton fabric. The fabric, which initially was white in color, now as the color of copper metal, while retaining the flexibility and physical characteristics of the original fabric. The metallic copper color remained unchanged after several launderings.

The configuration of the bath is such that in the Copper Sulfate step the fabric is set up vertically and not in the tradition horizontal pile to allow a clean reduction on to the fabric surface of the desired copper. The vertical positioning of the fabric is done with the aid of or plurality of poles set up on a frame in an array similar to two spaced-apart rung ladders with the poles acting as the rungs. The fabric is interwoven in a repeating switchback array on the poles of the frame in such a way that at no place does the fabric touch other parts of the fabric. This configuration also allows the escape of gases as the chemicals react with one another thereby yielding a clean copper reduction on the fabric.

EXAMPLE 2

The procedure of Example 1 was repeated using cotton yarn in place of cotton fabric. The metallized yarn was then woven together with non-metallized yarn in ratios of between 3:97 and 10:90 to produce panels of fabric containing between 3 and 10% copper metallized fabric.

EXAMPLE 3

Antifungal susceptibility testing
Susceptibility testing was performed as follows:

Agar formulation used for this test was chosen in accordance with NCCLS document M27-A: RPMI 1640 medium (Sigma, St. Louis, Mo.) supplemented with 1.5% agar and 2% glucose (RPG) and buffered to pH 7.0 with 0.165 M morpholinepropanesulfonic acid buffer (MOPS). For the test, 90-mm-diameter plates containing agar at a depth of 4.0 mm were used. For *Candida albicans*, and *Cryptococcus neoformans*, the inoculum was prepared from a 24 hr. culture and a 48 hr. culture, respectively; where for *Aspergillus fumigatus* and *Trichophyton mentagrophytes* a five-day old culture was used. Cell suspension was prepared in sterile 0.85% NaCl adjusted to a turbidity of a 0.5 Mc-Farland standard. The agar surface was inoculated by streaking a nontoxic swab dipped in a cell suspension across the entire surface of the agar in three directions. After excess moisture was absorbed into the agar and the surface was completely dry, panels of fabric prepared according to Example 2 and containing ionic copper-treated fibers in a concentration range of 3–10% were applied to each plate. The plates were incubated at 35° C. and read after 24 hr, 48 hr, and 7 days. Antifungal activity of the fabric was considered as positive if a zone of inhibition was visible underneath and surrounding the fabric.

EXAMPLE 4

Antibacterial susceptibility testing
Susceptibility testing was performed as described above for the antifungal activity in Example 3 with the following modifications:

Mueller-Hinton agar (Difco, Detroit, Mich.) was the medium used. The pH was adjusted to 7.2–7.4. The bacteria used for this study were *Escherichia coli* and *staphylococcus aureus*.

Results

The fabric containing ionic copper treated fibers subjected to the susceptibility of tests of Examples 2 and 3 in a concentration range of 3–10% exhibited characteristic inhibitory zone underneath and surrounding the fabric in each of the plates and in all of the concentrations tested, indicating its wide range of antifungal and antibacterial activity.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. An article of clothing having antibacterial, antifungal, and antiyeast properties, comprising at least a panel of a metallized textile, said textile including fibers selected from the group consisting of natural fibers, synthetic cellulosic fibers, regenerated protein fibers, acrylic fibers, polyolefin fibers, polyurethane fibers, vinyl fibers, and blends thereof, and having a plating including an antibacterial, antifungal and antiyeast effective amount of at least one oxidant cationic species of copper wherein the plating is bonded directly to the fibers.

2. An article of clothing according to claim 1, wherein said textile is a woven fabric.

3. An article of clothing according to claim 1, wherein said textile is a non-woven fabric.

4. An article of clothing according to claim 1, wherein said article is an article of hosiery.

5. An article of clothing according to claim 1, wherein said article is an undergarment.

6. An article of clothing according to claim 1, wherein said article is an undergarment and said panel is positioned in the crotch area thereof.

* * * * *